US012673741B2

(12) United States Patent
Wang

(10) Patent No.: US 12,673,741 B2
(45) Date of Patent: Jul. 7, 2026

(54) DRIFTING VEHICLE FRAME

(71) Applicant: Shenzhen Xincheng future Technology Co., LTD, Shenzhen (CN)

(72) Inventor: HuiZhong Wang, Shenzhen (CN)

(73) Assignee: Shenzhen Xincheng future Technology Co., LTD, Shenzhen (CN)

(\*) Notice: Subject to any disclaimer, the term of this patent is extended or adjusted under 35 U.S.C. 154(b) by 419 days.

(21) Appl. No.: 18/355,748

(22) Filed: Jul. 20, 2023

(65) Prior Publication Data

US 2025/0026430 A1     Jan. 23, 2025

(51) Int. Cl.
B62K 17/00 (2006.01)
B62K 21/12 (2006.01)

(52) U.S. Cl.
CPC .............. B62K 17/00 (2013.01); B62K 21/12 (2013.01)

(58) Field of Classification Search
CPC ........ B62K 17/00; B62K 21/12; B62K 13/04; B62K 11/07; B62K 19/30; B62J 1/08
See application file for complete search history.

(56) References Cited

U.S. PATENT DOCUMENTS

| | | | |
|---|---|---|---|
| 3,115,350 A | 12/1963 | Quick, Jr. | |
| 6,402,174 B1 | 6/2002 | Maurer | |
| 7,588,110 B2 * | 9/2009 | Martino | B62D 61/06 180/311 |
| 9,688,340 B1 * | 6/2017 | Kroymann | A63C 17/28 |
| 10,758,435 B2 * | 9/2020 | Adams, III | A61G 5/10 |
| D1,056,060 S * | 12/2024 | Wang | D21/426 |
| 2010/0237645 A1 * | 9/2010 | Trainer | G09F 21/04 180/216 |
| 2016/0264202 A1 * | 9/2016 | Vulk, Jr. | B62K 5/06 |
| 2017/0326008 A1 * | 11/2017 | Richard | A61G 5/0833 |

FOREIGN PATENT DOCUMENTS

| | | | | |
|---|---|---|---|---|
| CN | 207510618 | * | 6/2018 | B62K 17/00 |
| CN | 207510618 U | | 6/2018 | |
| CN | 213473425 U | | 6/2021 | |

* cited by examiner

*Primary Examiner* — Valentin Neacsu
*Assistant Examiner* — Marlon Arce

(57)     ABSTRACT

The present utility model provides a drifting vehicle frame. The drifting vehicle frame comprises a seat support apparatus provided with symmetrically rotating rollers and an adjusting apparatus telescopically connected to the seat support apparatus, wherein the adjusting apparatus comprises a first connecting rod, a butt strap component positioned below the first connecting rod, and a handle component passing through the first connecting rod and the butt strap component, the handle component is fixed on the first connecting rod, and the butt strap component takes the handle component as a rotation center and is connected to the handle component. According to the drifting vehicle frame of the present utility model, a driver rides on the seat support apparatus, steps on the butt strap component with feet, and holds the handle component with hands; when the drifting vehicle steers, the feet of the driver use the butt strap component to control and adjust a direction of a balancing vehicle, the hands hold the handle component tightly, and the driver may keep body balance as much as possible while steering or drifting, so that the stability of the driver in drifting is improved, and the vehicle is more convenient to use.

9 Claims, 3 Drawing Sheets

DRIFTING VEHICLE FRAME

TECHNICAL FIELD

The present utility model relates to the technical field of balancing vehicles, and in particular, to a drifting vehicle frame.

BACKGROUND

The balancing vehicle has attracted more attention and is popular among consumers because of small volume, light weight, and easy portability and manipulation, and is often used as a tool for riding instead of walking and leisure by consumers. In a drifting vehicle frame in the conventional technology, a butt strap component of an adjusting apparatus of the drifting vehicle frame is fixed on a handle component, the handle component is rotated to drive the butt strap component to rotate when the drifting vehicle frame steers, a balancing vehicle frame is driven to steer through the butt strap component, the handle component is controlled to turn by hands in the drifting process, a driver needs to keep body balance and operate the handle component by hands, which will increase the burden on the driver, consequently, the drifting stability is reduced, and the use is inconvenient.

Therefore, it is necessary to provide a drifting vehicle frame to solve the foregoing technical problems.

SUMMARY

The present utility model provides a drifting vehicle frame, which solves the following problems: the drifting vehicle frame in the conventional technology drives the butt strap component to rotate through the rotation of the handle component, the butt strap component drives a balancing vehicle to rotate, a driver needs to use hands to operate the handle component while maintaining the balance of the body in the process of drifting, which increases the burden on the driver, consequently, the drifting stability is reduced, and the use is inconvenient.

In order to solve the foregoing technical problems, a technical solution of the present utility model is that: a drifting vehicle frame comprising: a seat support apparatus provided with symmetrically rotating rollers at a bottom and an adjusting apparatus telescopically connected to the seat support apparatus, wherein the adjusting apparatus comprises a first connecting rod connected to the seat support apparatus, a butt strap component positioned below the first connecting rod and configured to buckle to a balancing vehicle, and a handle component positioned above the first connecting rod and passing through the butt strap component and the first connecting rod, the handle component is fixedly connected to the first connecting rod, and the butt strap component rotates by taking the handle component as a rotation center and is connected to the handle component.

In the present utility model, the butt strap component comprises a support plate connected to the handle component and concave connecting plates that are separately connected to two ends of a bottom of the support plate and configured to buckle to the balancing vehicle, and the connecting plate is connected to the support plate in a swinging mode.

In the present utility model, the connecting plate is provided with a pedal with an inclined plane, and the support plate is positioned in the pedal.

In the present utility model, the handle component comprises an extension rod and a handle that is connected to a top of the extension rod and transversely disposed on the extension rod, and the extension rod passes through the first connecting rod and the support plate.

In the present utility model, the adjusting apparatus is further provided with a first damping spring, and the first damping spring is sleeved on the extension rod and is positioned between the first connecting rod and the support plate.

In the present utility model, the extension rod passes through a center of the support plate.

In the present utility model, the seat support apparatus comprises a second connecting rod, a mounting seat connected to one end that is of the second connecting rod and that is far away from the first connecting rod, and a seat support that is positioned on the mounting seat and is provided with a backrest board, and the rollers are connected to two sides of a bottom of the seat support.

In the present utility model, bolts are further disposed at the second connecting rod; and the first connecting rod is provided with a plurality of first through holes, the second connecting rod is provided with second through holes matched with the first through holes, and the bolts are separately connected to the first through holes and the second through holes.

In the present utility model, second damping springs are symmetrically disposed at two sides of the mounting seat.

In the present utility model, the backrest board is provided with a plurality of ventilation holes.

Compared with the prior art, the present utility model has the following beneficial effects: according to the drifting vehicle frame of the present utility model, a driver rides on the seat support apparatus, steps on the butt strap component with feet, and holds the handle component with hands; when the drifting vehicle steers, the feet of the driver use the butt strap component to control and adjust a direction of a balancing vehicle, the hands hold the handle component tightly, and the driver may keep body balance as much as possible while steering or drifting, so that the stability of the driver in drifting is improved, and the vehicle is more convenient to use.

BRIEF DESCRIPTION OF DRAWINGS

To more clearly illustrate the technical solution in the embodiments of the present utility model or in the prior art, the drawings required to be used in the description of the embodiments or the prior art are briefly introduced below. The drawings in the following description are only the corresponding drawings of some embodiments of the present utility model.

DETAILED DESCRIPTION OF EMBODIMENTS

To make objectives, technical solutions, and advantages of embodiments of the present disclosure clearer, the following clearly and completely describes technical solutions in embodiments of the present disclosure with reference to accompanying drawings in embodiments of the present disclosure. It is clear that the described embodiments are merely some but not all of embodiments of the present disclosure. Based on the described embodiments of the present disclosure, all other embodiments obtained by those of ordinary skill in the art without creative efforts fall within the protection scope of the present disclosure.

Unless otherwise defined, the technical terms or scientific terms used herein shall have the ordinary meaning understood by those of ordinary skill in the art to which the present disclosure belongs.

The terms "first", "second", and the like used in the specification and claims of this patent application do not indicate any order, quantity, or importance, but rather are used to distinguish different components. The terms "comprises", "includes", or other similar terms mean that the elements or items listed before "comprises" or "includes" cover the elements or items and equivalents thereof listed after "comprises" or "includes", and other elements or items are not excluded. The terms "connection", "connect to", or other similar terms are not limited to physical or mechanical connections, but may include electrical connections, whether direct or indirect. The terms "upper", "lower", "left", "right", and the like are only used to indicate the relative positional relationship. When the absolute position of the described object changes, the relative positional relationship may also change accordingly.

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those skilled in the art without creative efforts fall within the protection scope of the present utility model.

The present utility model provides a preferred embodiment of a drifting vehicle frame capable of solving the above technical problems.

Figure 1:
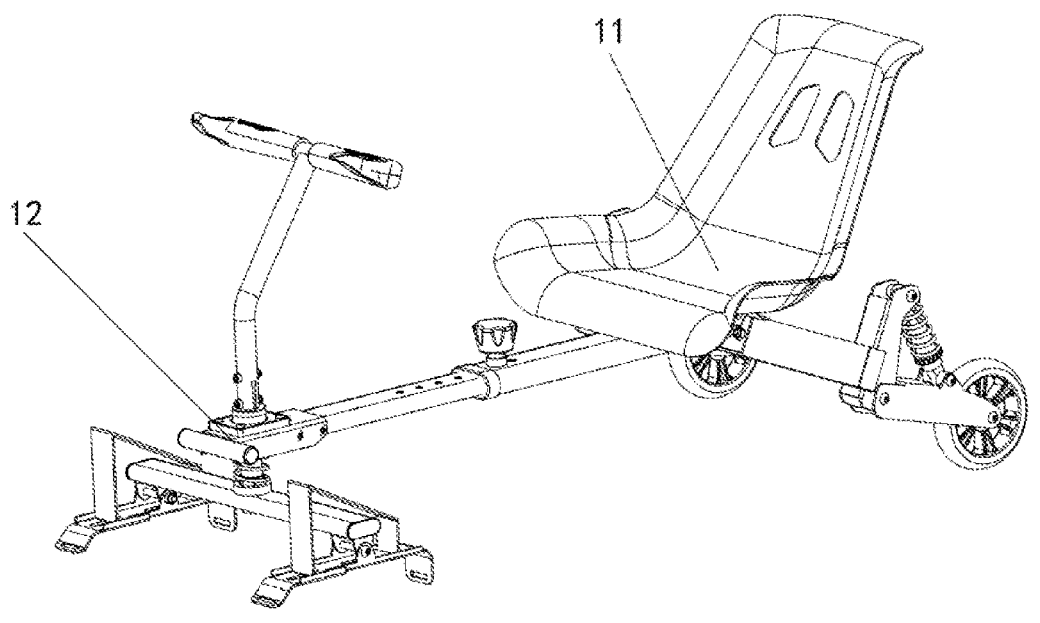
FIG. 1 is a perspective view of a drifting vehicle frame according to the present utility model.
Figure 2:
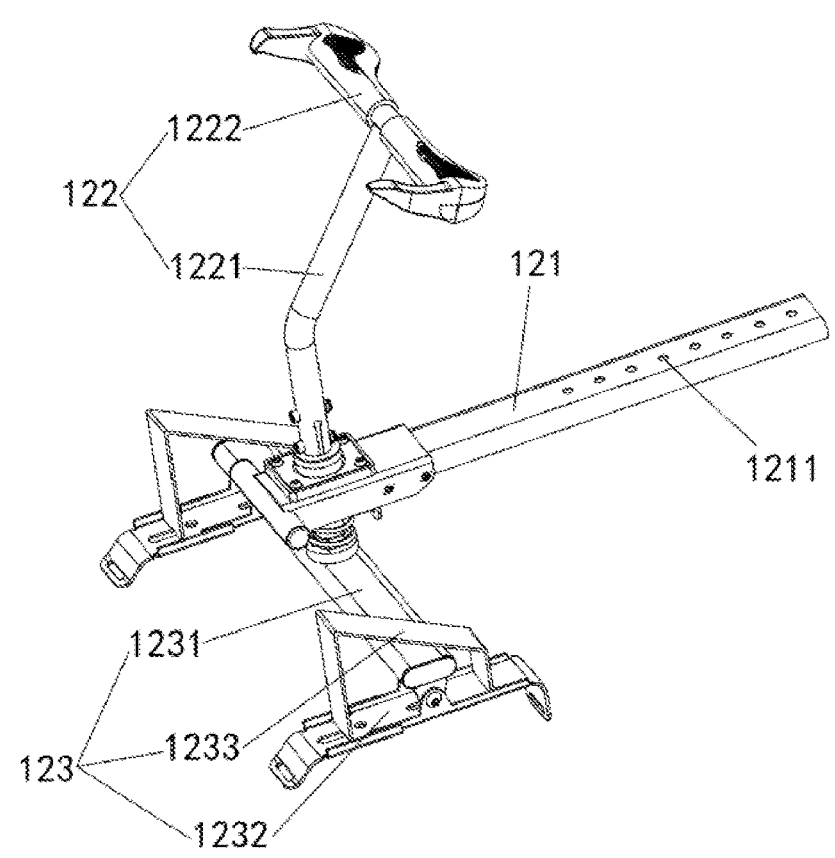
FIG. 2 is a perspective view of an adjusting apparatus of a drifting vehicle frame according to the present utility model.
Figure 3:
FIG. 3 is a perspective view of an adjusting apparatus of a drifting vehicle frame according to the present utility model.
Figure 3:
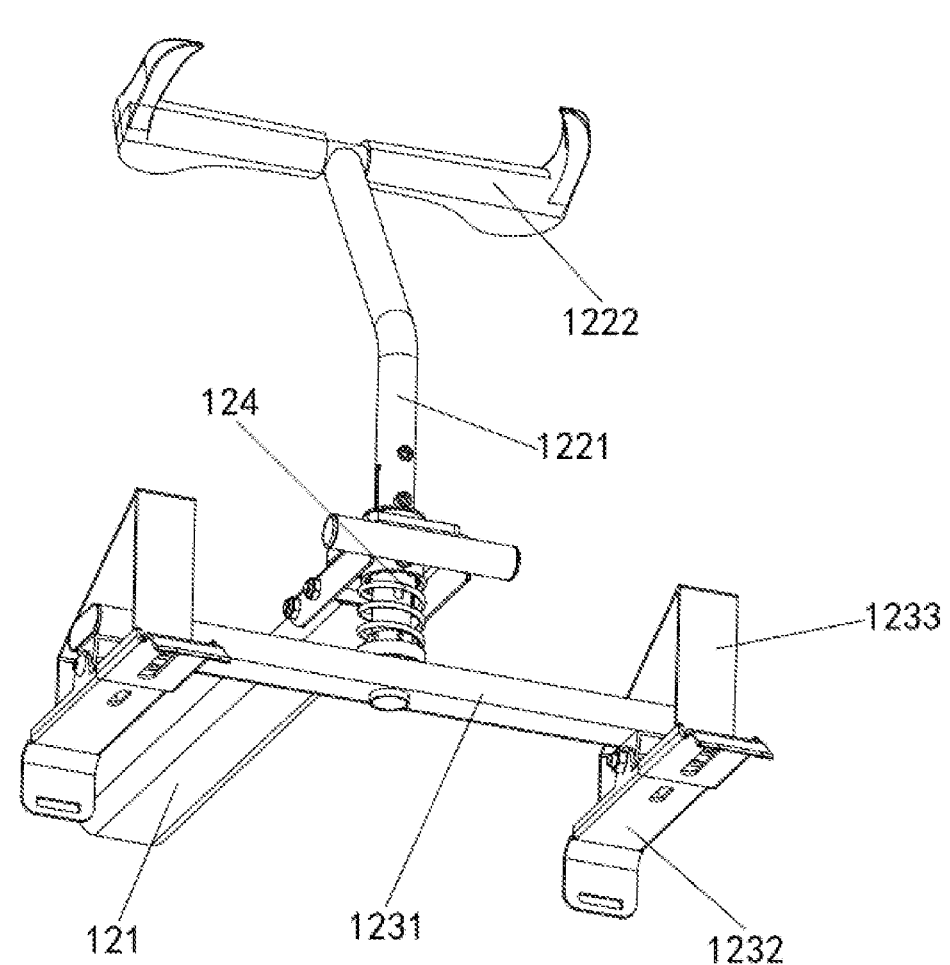
Figure 4:
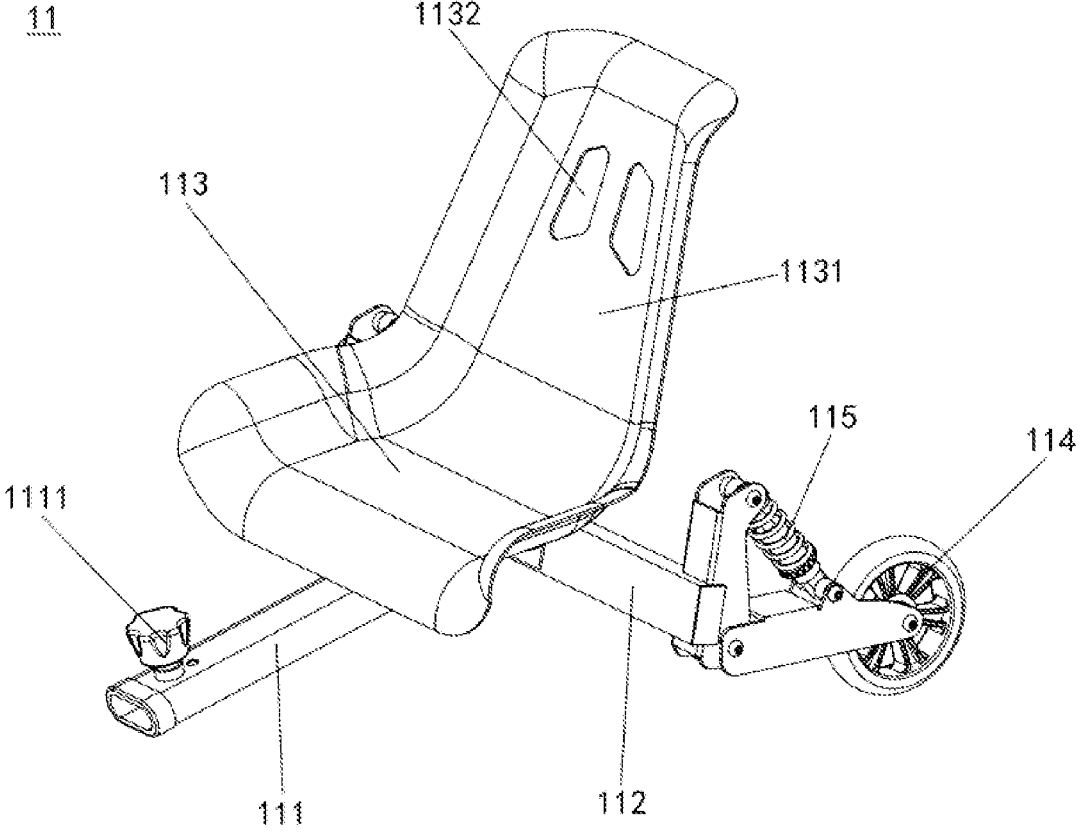
FIG. 4 is a perspective view of a seat support apparatus of a drifting vehicle frame according to the present utility model.

Referring to FIG. 1, FIG. 2, FIG. 3, and FIG. 4, where FIG. 1 is a perspective view of a drifting vehicle frame according to the present utility model, FIG. 2 is a perspective view of an adjusting apparatus of a drifting vehicle frame according to the present utility model, FIG. 3 is a perspective view of an adjusting apparatus of a drifting vehicle frame according to the present utility model, and FIG. 4 is a perspective view of a seat support apparatus of a drifting vehicle frame according to the present utility model.

In the drawings, elements having similar structures are denoted by the same reference numerals.

In the present utility model, the terms "first", "second", and the like are merely intended for description, and shall not be interpreted as indicating or implying relative importance, nor as limiting the sequence.

The present utility model provides a drifting vehicle frame, comprising: a seat support apparatus 11 provided with symmetrically rotating rollers 114 at a bottom and an adjusting apparatus 12 telescopically connected to the seat support apparatus 11, wherein the adjusting apparatus 12 comprises a first connecting rod 121 connected to the seat support apparatus 11, a butt strap component 123 positioned below the first connecting rod 121 and configured to buckle to a balancing vehicle, and a handle component 122 positioned above the first connecting rod 121 and passing through the butt strap component 123 and the first connecting rod 121, the handle component 122 is fixedly connected to the first connecting rod 121, and the butt strap component 123 rotates by taking the handle component 122 as a rotation center and is connected to the handle component 122. The seat support apparatus 11 is configured for a driver to ride, and the adjusting apparatus 12 is configured to buckle to a balancing vehicle and control the rotation of the balancing vehicle. When the balancing vehicle frame is needed to offset during use, the butt strap component 123 is buckled onto the balancing vehicle, and then the driver rides on the seat support apparatus 11 and steps on the butt strap component 123. In the use process, the driver controls the butt strap component 123 by feet to adjust a direction of the balancing vehicle; and in the drifting process, the driver can keep body balance as much as possible by tightly holding the handle component 122 with the hand so as not to be separated from the vehicle, so that the stability of the driver in drifting can be improved and the use is more convenient.

The butt strap component 123 comprises a support plate 1231 connected to the handle component 122 and concave connecting plates 1232 that are separately connected to two ends of a bottom of the support plate 1231 and configured to buckle to the balancing vehicle, and the connecting plate 1232 is connected to the support plate 1231 in a swinging mode. The support plate 1231 is configured to connect to the handle component 122, the support plate 1231 is configured to install the connecting plate 1232, the connecting plate 1232 is configured to buckle to the balancing vehicle, and the connecting plate 1232 swings on the support plate 1231 and is configured to adjust an angle at which the connecting plate 1232 is buckled to the balancing vehicle.

The first connecting rod 121 is provided with a pedal 1233 with an inclined plane, and the support plate 1231 is positioned in the pedal 1233. The pedal 1233 is configured to place the feet of a driver, which is convenient for the driver to adjust the connecting plate 1232 through the pedal 1233, thereby adjusting the balancing vehicle.

The handle component 122 comprises an extension rod 1221 and a handle 1222 that is connected to a top of the extension rod 1221 and transversely disposed on the extension rod 1221, and the extension rod 1221 passes through the first connecting rod 121 and the support plate 1231. The extension rod 1221 is configured to extend a height of the handle 1222, so that the handle 1222 can be conveniently held by the hands of a driver.

The adjusting apparatus 12 is further provided with a first damping spring 124, and the first damping spring 124 is sleeved on the first connecting rod 121 and is positioned between the first connecting rod 121 and the support plate 1231. The first damping spring 124 is configured to reduce the shock of the adjusting apparatus 12, so that the adjusting apparatus 12 is more stable in the drifting process.

The extension rod 1221 passes through a center of the support plate 1231, and the lengths of two sides of the support plate 1231 are basically the same when the support plate rotates around the extension rod 1221, so that it is ensured that the wheelbases of the two sides are the same when steering.

The seat support apparatus 11 comprises a second connecting rod 111, a mounting seat 112 connected to one end that is of the second connecting rod 111 and that is far away from the first connecting rod 121, and a seat support 113 that is positioned on the mounting seat 112 and is provided with a backrest board 1131, and the rollers 114 are connected to two sides of a bottom of the seat support 113. The second connecting rod 111 is configured to connect the first connecting rod 121 and support the mounting seat 112, the mounting seat 112 is configured to support the seat support 113, and the seat support 113 is convenient for the driver to ride.

The bolts 1111 are further disposed at the second connecting rod 111, the first connecting rod 121 is provided with a plurality of first through holes 1211, the second connecting rod 111 is provided with second through holes matched with the first through holes 1211, and the bolts 1111 are separately connected to the first through holes 1211 and the second through holes. The bolts 1111 are connected to the first through holes 1211 and the second through holes at different positions so as to adjust the lengths of the first connecting rod 121 and the second connecting rod 111, and therefore drivers with different heights can drive conveniently. Meanwhile, when the bolts 1111 are fixed in the first through holes 1211 and the second through holes, the first connecting rod 121 and the second connecting rod 111 are prevented from being separated.

The second damping springs 115 are symmetrically disposed at two sides of the mounting seat 112. The second damping springs 115 are configured to reduce the shock of the seat support 113, so that the driver can ride on the seat support 113 more stably.

The backrest board 1131 is provided with a plurality of ventilation holes 1132, and the ventilation holes 1132 are configured to facilitate heat dissipation of the back of a driver. Working principle:

The drifting vehicle frame comprises: a seat support apparatus 11 provided with symmetrically rotating rollers 114 and an adjusting apparatus 12 telescopically connected to the seat support apparatus 11, wherein the adjusting apparatus 12 comprises a first connecting rod 121 connected to the seat support apparatus 11, a butt strap component 123 positioned below the first connecting rod 121 and configured to buckle to a balancing vehicle, and a handle component 122 positioned above the first connecting rod 121 and passing through the first connecting rod 121 and the butt strap component 123, the handle component 122 is fixedly connected to the first connecting rod 121, and the butt strap component 123 rotates by taking the handle component 122 as a rotation center and is connected to the handle component 122. The handle component 122 comprises an extension rod 1221 and a handle 1222 transversely connected to the extension rod 1221. The butt strap component 123 comprises a support plate 1231, connecting plates 1232 that are separately positioned at two ends of a bottom of the support plate 1231 and are connected to the support plate 1231 in a swinging mode, pedals 1233 separately connected to the connecting plate 1232, wherein the pedal is concave. The support plate 1231 is positioned in the pedal 1233, and the pedal 1233 is provided with an inclined plane inclined to the seat support apparatus 11. The extension rod 1221 passes through the first connecting rod 121 and the support plate 1231. The adjusting apparatus 12 is further provided with a first damping spring 124 that is sleeved on the first extension rod 1221 and is positioned between the support plate 1231 and the first connecting rod 121. The first connecting rod 121 is provided with a plurality of first through holes 1211. The seat support apparatus 11 comprises a second connecting rod 111 connected to the first connecting rod 121, a mounting seat 112 connected to one end of the second connecting rod 111, a seat support 113 connected to the mount seat 112, and second damping springs 115 separately positioned at two sides of the mounting seat 112. The seat support 113 is further provided with a backrest board 1131. The backrest board 1131 is further provided with a plurality of ventilation holes 1132. The second connecting rod 111 is provided with second through holes matched with the first through holes 1211. The second connecting rod 111 is provided with bolts 1111 configured to pass through the first through holes 1211 and the second through holes.

When the drifting vehicle frame is used, firstly, the connecting plate 1232 is buckled on the balancing vehicle, the driver rides on the seat support 113, steps on the pedals 1233 with feet, and holds the handle 1222 with hands, and then the balancing vehicle is started. When the balancing vehicle needs to steer, the left foot of the feet of the driver extends forwards, because the support plate 1231 rotates by taking the extension rod 1221 as a center, the support plate 1231 on which the right foot is positioned moves towards the seat support apparatus 11 when the left foot extends. In the steering process, because the connecting plate 1232 is connected to the support plate 1231 in a swinging mode, the connecting plate 1232 can timely adjust an angle at which the connecting plate is buckled to the balancing vehicle when the vehicle is turning; on the contrary, when the right foot extends, the support plate 1231 on which the left foot of the feet is positioned moves towards the seat support, so that the steering direction is switched. Through the above operation, the driver puts the feet on the pedals 1233, the direction of the support plate 1231 is adjusted through the pedals 1233 for steering, the driver holds the handle 1222 with hands to keep body balance as much as possible, which reduces the driving burden of a driver, effectively increases the stability of drifting, and makes driving more convenient.

According to the drifting vehicle frame of this preferred embodiment, a driver rides on the seat support apparatus, steps on the butt strap component with feet, and holds the handle component with hands; when the drifting vehicle steers, the feet of the driver use the butt strap component to control and adjust a direction of a balancing vehicle, the hands hold the handle component tightly, and the driver may keep body balance as much as possible while steering or drifting, so that the stability of the driver in drifting is improved, and the vehicle is more convenient to use.

In conclusion, although the present utility model has been disclosed above with preferred embodiments, the foregoing preferred embodiments are not intended to limit the present utility model, and those of ordinary skill in the art can make various changes and modifications without departing from the spirit and scope of the present utility model. Therefore, the protection scope of the present utility model shall be subject to the scope defined by the claims.

What is claimed is:

1. A drifting vehicle frame, comprising:
a seat support apparatus provided with symmetrically rotating rollers at a bottom, and
an adjusting apparatus telescopically connected to the seat support apparatus,
wherein the adjusting apparatus comprises a first connecting rod connected to the seat support apparatus, a butt strap component positioned below the first connecting rod and configured to buckle to a balancing vehicle, and a handle component positioned above the first connecting rod and passing through the butt strap component and the first connecting rod, the handle component is fixedly connected to the first connecting rod, and the butt strap component rotates by taking the handle component as a rotation center and is connected to the handle component;
wherein the butt strap component comprises a support plate connected to the handle component and concave connecting plates that are separately connected to two ends of a bottom of the support plate and configured to buckle to the balancing vehicle; each concave connecting plate is provided with a pedal with an inclined plane, and the support plate is positioned in the pedal.

2. The drifting vehicle frame according to claim 1, wherein each concave connecting plate is connected to the support plate in a swinging mode.

3. The drifting vehicle frame according to claim 2, wherein the handle component comprises an extension rod and a handle that is connected to a top of the extension rod and transversely disposed on the extension rod, and the extension rod passes through the first connecting rod and the support plate.

4. The drifting vehicle frame according to claim 3, wherein the adjusting apparatus is further provided with a first damping spring, and the first damping spring is sleeved on the extension rod and is positioned between the first connecting rod and the support plate.

5. The drifting vehicle frame according to claim 3, wherein the extension rod passes through a center of the support plate.

6. The drifting vehicle frame according to claim 1, wherein the seat support apparatus comprises a second connecting rod, a mounting seat connected to one end that is of the second connecting rod and that is far away from the first connecting rod, and a seat support that is positioned on the mounting seat and is provided with a backrest board, and the rollers are connected to two sides of a bottom of the seat support.

7. The drifting vehicle frame according to claim 6, wherein bolts are further disposed at the second connecting rod; and the first connecting rod is provided with a plurality of first through holes, the second connecting rod is provided with second through holes matched with the first through holes, and the bolts are separately connected to the first through holes and the second through holes.

8. The drifting vehicle frame according to claim 6, wherein second damping springs are symmetrically disposed at two sides of the mounting seat.

9. The drifting vehicle frame according to claim 6, wherein the backrest board is provided with a plurality of ventilation holes.

* * * * *